Figure 2:
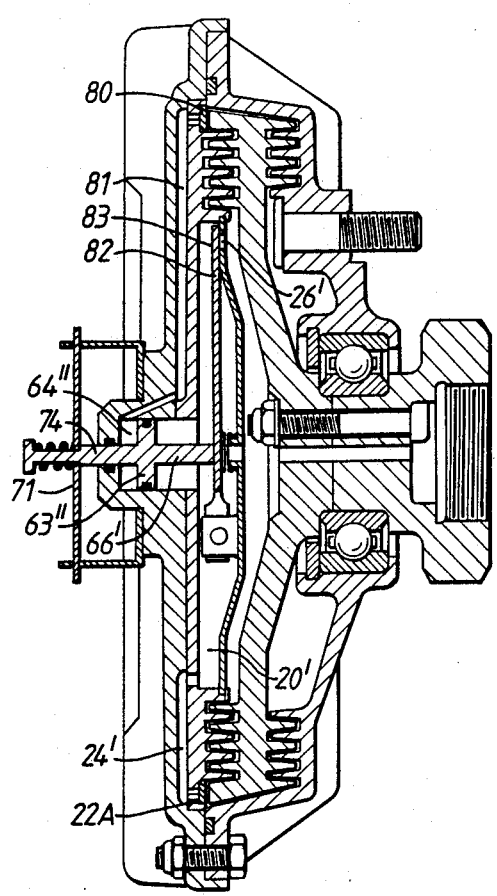

United States Patent [19]

Elmer

[11] Patent Number: 4,909,367
[45] Date of Patent: Mar. 20, 1990

[54] AUTOMATIC THERMAL AND SPEED CONTROLS FOR VISCOUS FLUID CLUTCHES

[75] Inventor: Arthur E. H. Elmer, Nailsworth, Great Britain

[73] Assignee: Kysor Industrial Corporation, Cadillac, Mich.

[21] Appl. No.: 140,990

[22] Filed: Jan. 5, 1988

[30] Foreign Application Priority Data

Jan. 7, 1987 [GB] United Kingdom ............... 8700213

[51] Int. Cl.⁴ ............................................. F16D 35/00
[52] U.S. Cl. ............................. 192/58 B; 192/82 T; 192/83; 192/103 F
[58] Field of Search ............... 192/58 B, 82 T, 83, 192/103 F, 104 F; 123/41.11, 41.12

[56] References Cited

U.S. PATENT DOCUMENTS

| | | | |
|---|---|---|---|
| 3,144,922 | 8/1964 | Weir | 192/58 B |
| 3,159,254 | 12/1964 | Weir | 192/58 B |
| 3,191,733 | 6/1965 | Weir | 192/58 B |
| 3,194,372 | 7/1965 | Weir | 192/58 B |
| 3,217,849 | 11/1965 | Weir | 192/82 T |
| 3,363,734 | 1/1968 | Sabat | 192/58 B |
| 3,444,748 | 5/1969 | Sutaruk | 192/58 B X |
| 3,757,914 | 9/1973 | Elmer | 192/58 B X |
| 3,902,663 | 9/1975 | Elmer | 123/41.12 X |
| 3,961,606 | 6/1976 | Wong | 123/41.12 |
| 4,116,318 | 9/1978 | Crisenbery et al. | 192/58 B |
| 4,176,630 | 12/1979 | Elmer | 192/82 T X |
| 4,189,095 | 2/1980 | Monigold et al. | 192/82 T X |
| 4,298,111 | 11/1981 | Hayashi | 192/58 B |
| 4,351,426 | 9/1982 | Bopp | 192/58 B |
| 4,437,554 | 3/1984 | Haeck | 192/58 B |
| 4,597,481 | 7/1986 | Muller et al. | 192/82 T X |
| 4,650,045 | 3/1987 | Weible et al. | 192/0.02 R |
| 4,653,624 | 3/1987 | Mader | 192/58 B |

FOREIGN PATENT DOCUMENTS

| | | |
|---|---|---|
| 0105647 | 4/1984 | European Pat. Off. . |
| 0130724 | 1/1985 | European Pat. Off. . |
| 3204554 | 8/1982 | Fed. Rep. of Germany . |
| 3242381 | 6/1983 | Fed. Rep. of Germany . |
| 2315000 | 1/1977 | France . |
| 2441764 | 6/1980 | France . |

Primary Examiner—Rodney H. Bonck
Attorney, Agent, or Firm—Price, Heneveld, Cooper, DeWitt and Litton

[57] ABSTRACT

A viscous fluid clutch for driving a cooling fan 18 from the crankshaft of an internal combustion engine includes an outer rotary casing 11, 12 connected to the fan and an inner rotary member 10 connected to the crankshaft coupling 9. The clearance gap between these two members is normally occupied by a viscous fluid and the drive is automatically adjusted by varying the quantity of fluid in the gap. A scoop pump 22 continuously pumps fluid from the gap inwards along passage 24 to a reservoir 20 via control valve 50, and the fluid returns to the clearance gap from the reservoir via a port 26. The valve 50 includes a piston 61, which is subject on one side of the pressure of the fluid supplied by the scoop pump 22, and hence to the relative speed of rotation between the crankshaft and the fan. In the other direction the piston 61 is subject to the fluid servo pressure in a conduit 48 derived from the sensed temperature of the engine coolant in duct 40.

16 Claims, 6 Drawing Sheets

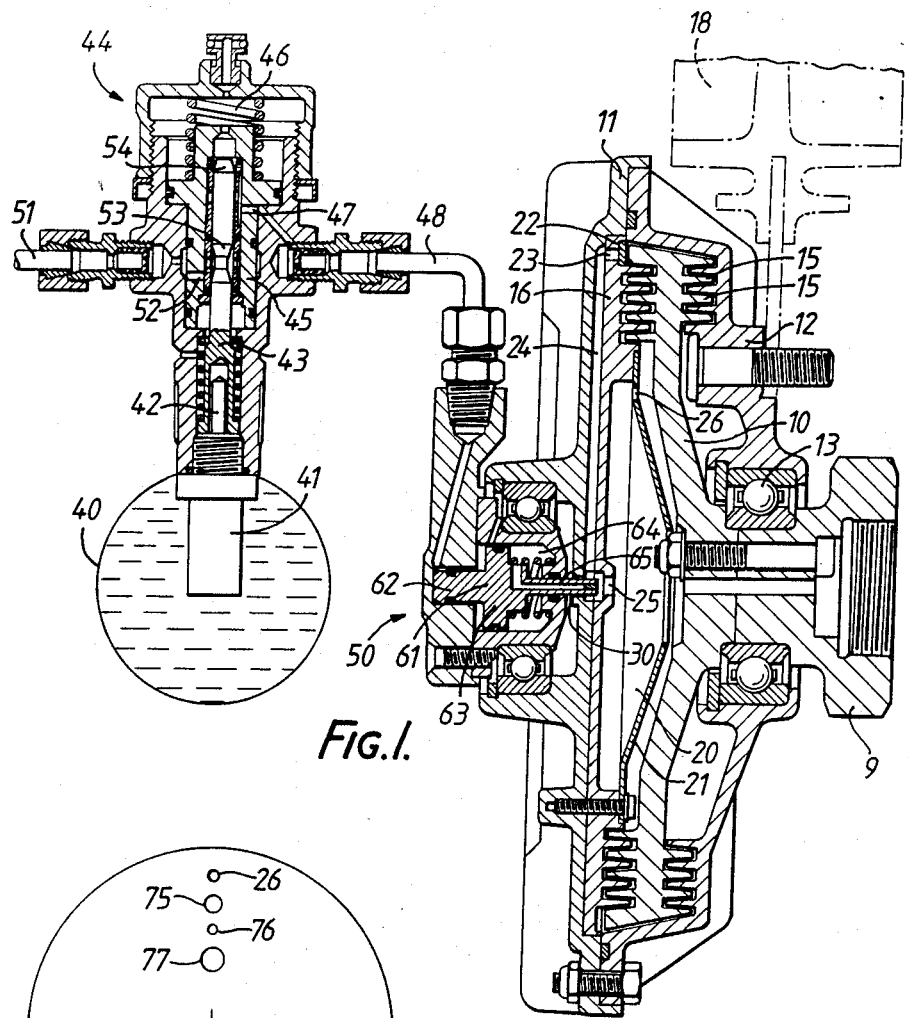
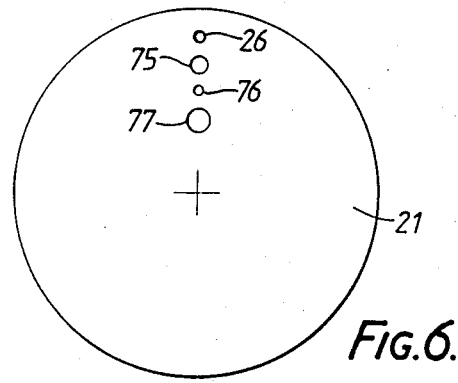
Fig.1.
Fig.6.

AUTOMATIC THERMAL AND SPEED CONTROLS FOR VISCOUS FLUID CLUTCHES

This invention relates to automatic controls for viscous fluid clutches and is particularly though not exclusively applicable to controls for viscous fluid clutches incorporated in drives to cooling fans for vehicle engines. It is well-known that for optimum efficiency the speed of the fan needs to be controlled in response to a number of operating parameters, primarily the sensed temperature of a component of the engine, for which purpose it is normal to sense the temperature of the coolant liquid or a cooling air stream. Many systems already exist for controlling a clutch or other coupling between an engine and an associated cooling fan to vary the speed of the fan in accordance with a sensed temperature with the object of maintaining engine temperature approximately within a predetermined range. It has also been proposed to combine a temperature sensing control with a speed sensing control sensitive directly or indirectly to fan speed.

For a number of reasons, however, it has been found that existing temperature and speed sensing controls are unsatisfactory. It is an object of the present invention accordingly to provide an improved control for a viscous fluid clutch, which is responsive both to a sensed temperature and to a sensed speed of a component of the clutch or coupling, and which will overcome some of the existing problems and limitations.

The invention is particularly applicable to controls for viscous fluid clutches of the type having means for controlling the torsional drive through the clutch by transferring fluid from the clearance gap of the clutch to a reservoir and allowing controlled quantities of fluid to return from the reservoir to the clearance gap, the quantity of fluid in the clearance gap being varied to effect adjustments in the torsional drive.

Now broadly stated from one aspect the invention consists in a viscous fluid clutch comprising a rotary casing connected to rotate with one drive element and an inner clutch member within said casing spaced therefrom by a clearance gap and connected to rotate with another drive element, a reservoir communicating with said clearance gap and pump means adjacent said clearance gap to receive fluid therefrom and deliver fluid under pressure to said reservoir in response to relative rotation between said casing and said inner member, thermal sensing means for sensing the temperature of a fluid external to said casing and for generating a pressure force dependent thereon, and valve means controlling the flow of fluid between said pump and said clearance gap, said valve means having a movable control element acted upon in one direction by a pressure force derived from said pump means and in the opposing direction by a pressure force derived from said thermal sensing means, whereby a change in pump pressure caused by change in speed of rotation, or a change in the sensed temperature, tends to adjust said valve means and thereby change the quantity of fluid in said clearance gap.

According to a preferred feature of the invention the clutch constitutes the drive to a cooling fan for an engine and the thermal sensor of the control system may be arranged to sense the temperature of the air or other fluid flowing through the fan. Alternatively the thermal sensor may be arranged to sense the temperature of a different coolant liquid for the engine in which case it may be convenient to incorporate a servo pressure supply with a regulating valve governing servo pressure in response to the sensed temperature.

According to another preferred feature of the invention the clutch may include two fluid impellers or pumps, one for transferring fluid from the clearance gap to the reservoir, and the other for generating said fluid control pressure responsive to the relative speed of the components of the clutch.

In some forms of the invention the valve means is arranged to control the flow of fluid through a supply passage between the pump and the reservoir, in which case reduction in the flow tends to increase the quantity of fluid in the clearance gap. In other forms of the invention the valve means may be arranged to control the flow through a return passage or port between the reservoir and the clearance gap. In this case a reduction in the flow causes a reduction in the quantity of fluid in the clearance gap. In either case reduction in the quantity of fluid in the clearance gap or working volume of the clutch reduces the torsional transmission.

The clutch may include a differential piston or piston assembly exposed on one side, or in one direction, to the pressure of the hydraulic fluid generated by an internal pump in the fluid clutch and on the other side, or in the other direction, to the pressure of a fluid, or to spring pressure, generated by and related to the sensed temperature. Conveniently the fluid pressure acting in the first direction or on the first side of the piston is derived from a pump actuated by relative movement between the two components of the fluid clutch.

The automatic temperature sensing may be achieved in various ways, but in a preferred arrangement the thermally responsive fluid pressure is generated by a valve having a thermal sensing element and a supply of fluid under pressure, the valve being arranged to modify the pressure output to the differential piston in accordance with the sensed temperature.

In one construction according to the invention the differential piston or assembly is arranged to control a valve which modifies the flow rate of the viscous hydraulic fluid into or out of a reservoir, from which the fluid returns to the clearance volume of the clutch.

In an alternative arrangement the clutch includes a thermal sensing element positioned on the casing of the clutch and arranged to sense air temperature and acting via a spring on a piston exposed to fluid pressure responsive to the speed of one or more components of the clutch.

In any case it may be of advantage if the clutch includes two fluid impellers, or pumps, one for transferring fluid from the clearance volume to the reservoir and the other for generating fluid pressure responsive to the speed of the component of the clutch.

The valve unit for generating a fluid pressure responsive to sensed temperature is of considerable value in its own right and for other purposes. According to another aspect of the invention a valve for generating a fluid pressure responsive to a sensed temperature comprises a first valve element connected to and operated by a thermal sensing device, and a second valve element having a fluid piston and co-operating with the first valve element to open and close a valve orifice between an input pressure port and an output port which communicates with a chamber exposed to one side of the valve, such that changes in the sensed temperature cause movements of the first valve element to open and close the valve and the resultant changes in output pressure exerted on the valve piston cause the second valve member to move in a direction to close the valve and establish the required output pressure.

From another aspect the invention consists in a viscous fluid clutch of the type referred to, in which the return path from the reservoir to the clearance gap includes one or more apertures in a wall of the reservoir providing for fluid flow at two or more different radial positions from the axis of rotation.

Preferably the aperture or apertures are so arranged that the fluid flow from the reservoir is relatively low at increased radial positions from the axis, and in one preferred construction there are two or more separate return flow apertures at different radial positions. The outermost aperture will preferably be of reduced cross-sectional area.

Figure 3:
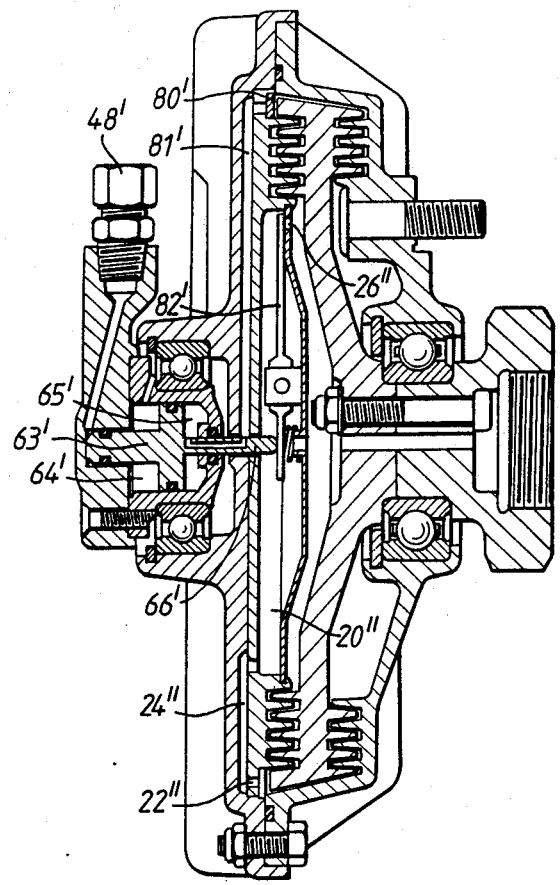
Figure 4:
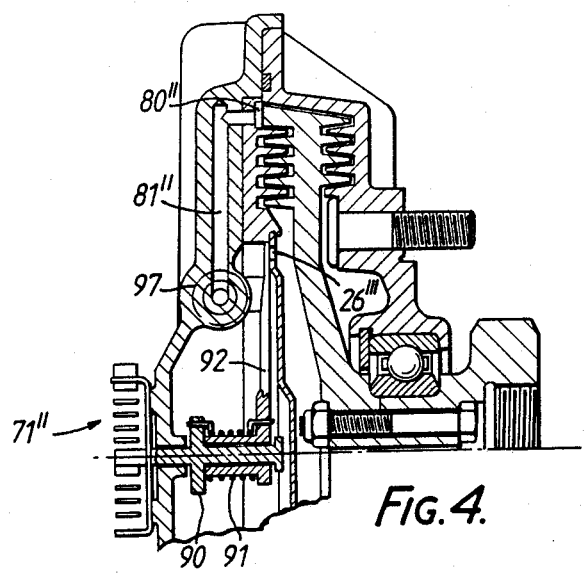
Figure 5:
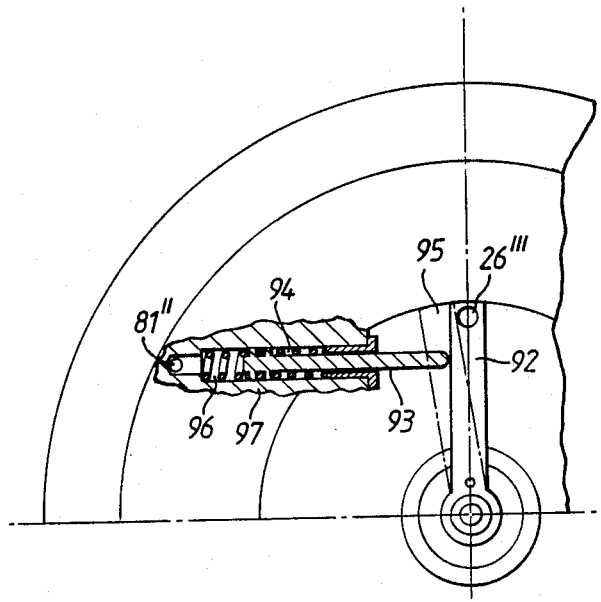
Figure 7:
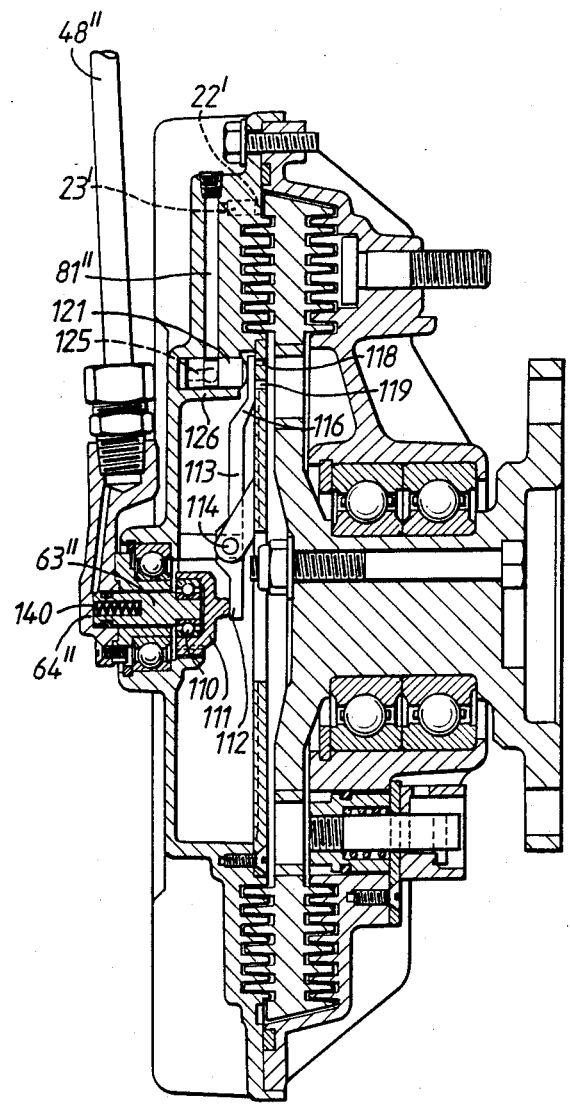
Figure 8:
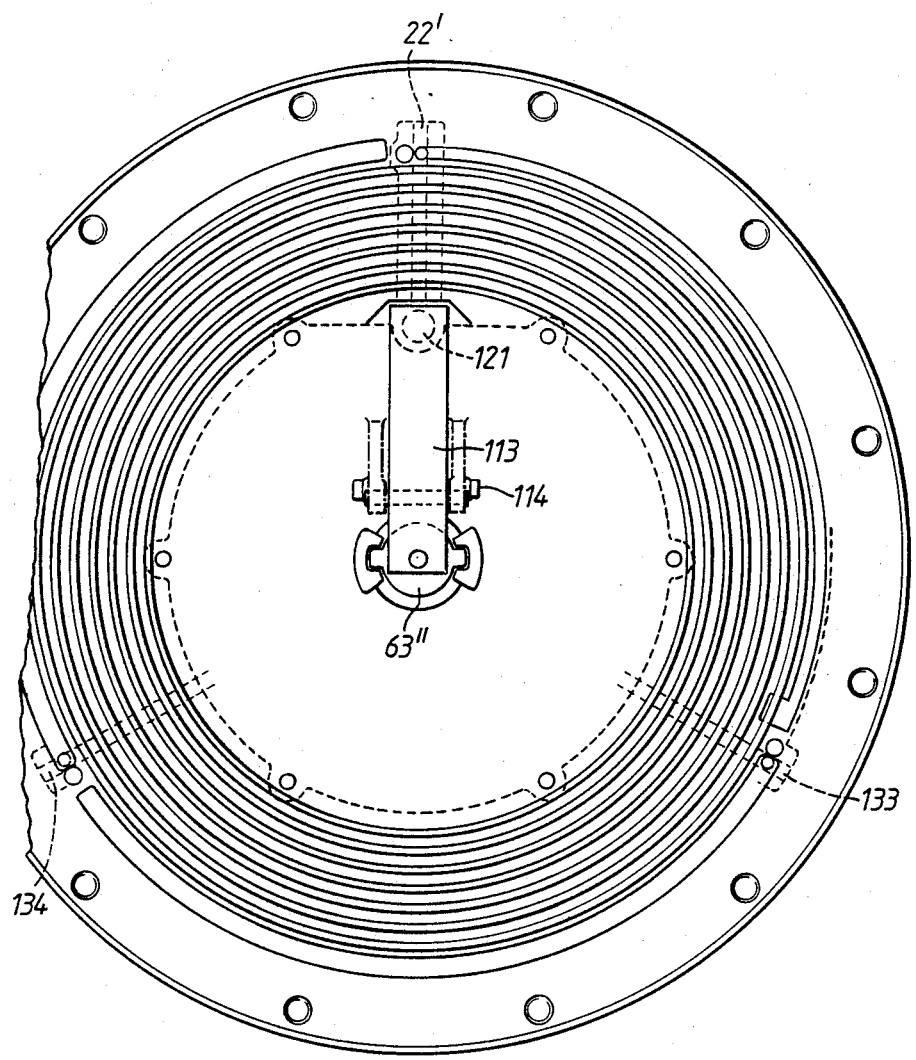

The invention may be performed in various ways and several embodiments will now be described, by way of example, with reference to the accompanying drawings, in which:

FIG. 1 is a diagrammatic sectional elevation of a first example of the invention in which the viscous fluid clutch is controlled in response to speed and coolant temperature, illustrated in the cold position, FIG. 2 is a sectional side elevation through another example of the invention in which a bi-metal temperature sensing element is combined with a servo piston, FIG. 3 is another side elevation illustrating a further modification with the parts in the cold coolant position, FIG. 4 is a sectional view through another example of the invention including a spiral bi-metal element, FIG. 5 is a diagrammatic end view of the previous example, FIG. 6 is a fragmentary diagrammatic end view of another example having multiple exit ports from the reservoir, FIG. 7 is a sectional view through another example of the invention using separate opposed pressure balancing pistons sensitive to scoop pressure and temperature, and FIG. 8 is an end view in section onto the embodiment of FIG. 7.

Referring first to the example of FIG. 1, the invention is applied to a viscous clutch of the general type comprising an internal rotor 10 connected to and driven by a coupling 9 attached to an engine drive shaft (not shown). The rotor 10 is positioned within a two part casing 11,12 having a bearing 13 which supports the casing off the coupling or shaft 9 and the rotor has a series of closely spaced annular rings 15 located respectively in annular grooves in the casing end 12 and in an internal partition wall 16. This provides a clearance gap on each of the two faces of the rotor of considerably extended area and in operation this clearance gap is filled with a suitable viscous hydraulic fluid to cause torsional drive, or evacuated to allow maximum slip. The invention is concerned more particularly with the control of the fluid in this clearance gap so as to vary the drive from the engine shaft to a rotary cooling fan 18 secured to the casing member 12.

In this example a fluid reservoir 20 is formed between the front wall 11 and an internal partition wall 21 and fluid is continuously pumped from the outer periphery of the clearance space by one or more scoops 22 which convey the oil forwards through an opening 23 into a radial passage 24 leading towards the rotary axis. At the axis there is a valve port 25 through which the fluid flows into the reservoir 20 and returns to the clearance space through a constantly open port 26. This port is not of sufficient size to allow all the oil pumped inwards by the scoop to return to the casing.

The flow of oil is controlled by a movable valve stem or plunger 30, which is shifted axially into or out of the port 25. When closing or partly closing the port the flow of fluid inwards from the scoop is restricted, all the fluid drains from the reservoir through the port 26 and the clearance gap in the clutch is fully flooded with the viscous fluid: this provides maximum drive or drag and the fan 18 is driven at close to shaft speed. By contrast when the valve stem 30 is shifted to the left to open the port 25 the scoop delivers fluid at maximum rate inwards along the passage 24 and this being faster than the rate of escape through the port 26 fluid builds up within the reservoir 20 and consequently results in a drainage of oil from the clearance gap. The drive through the clutch is therefore reduced, the fan speed 18 falls and the cooling effect on the engine radiator is reduced, as also the power absorbed in the fan drive.

The valve stem 30 is controlled in this example by a combination of coolant temperature with fan speed or scoop pump pressure. The coolant duct is illustrated at 40 which is conveniently the exit from the coolant radiator (not shown). A wax capsule 41 is positioned in the coolant passage and its operating stem 42 is positioned in one end of a movable valve stem 43 of a follow-up pressure control valve unit 44. The stem 43 moves within an axially floating spool 45 attached to a piston the upper side of which is exposed to atmospheric pressure and to a balancing spring 46. The underside of the piston is exposed to pneumatic servo-control pressure at 47, which is communicated via line 48 to the front end of a differential servo unit 50 at the front end of the clutch casing. Compressed air to operate the system is admitted to the valve unit 44 at 51, passes through the spool at the port 52 and is controlled by a shoulder 53 on the inner stem. This stem also has a tapered end 54 which combines with the spool so that as the coolant temperature rises and the stem lifts the escape of air at the conical end 54 is reduced and flow of pressurized air from the line 51 is increased. The spool correspondingly shifts upwards until the follow-up servo effect recreates the balance with increased force in tee spring 46 and increased pressure in the working volume below the piston 45. Thus, the pressure in line 48 always corresponds to the temperature of the coolant.

In the differential pressure unit 50 the air pressure in line 48 is reacted against the fluid pressure from the scoop 22 For this purpose a differential piston 61 has a small piston end 62 exposed to the air pressure in line 48 and a larger piston element 63 exposed to the hydraulic pressure in chamber 64 to which hydraulic fluid is admitted through an internal passage 65 having a lateral inlet opening. This passage effectively communicates at all times with the scoop delivery passage 24. Thus an increase in the air pressure in line 48 caused by an increase in the coolant temperature will cause the valve stem to move to the right to close the port 25 and hence drain the reservoir 20, flood the clearance space, increase the drive to the fan and so indirectly reduce the coolant temperature again.

By contrast if the fluid pressure at the scoop 22 increases, the pressure in volume 64 acts on the piston 63 to move the valve stem 30 in the opposite direction and so to reduce the drive to the fan.

Thus the system provides automatic control of the level of fluid in the clutch and hence the effective drive to the cooling fan which is dependent upon the relationship between the coolant temperature and the differential speed between the input and output of the clutch. Assuming any selected engine speed this is therefore dependent upon the an speed. The relationship can be selected and varied, as required, by control of any one of a number of parameters in the system such as the relative sizes of the differential piston areas, the strength of the springs in the pneumatic pressure control unit 44 and the differential piston unit 50, and the size of the valve orifice 25.

In a possible modification the clutch may be controlled in response to a combination of fan speed and coolant temperature, by means of an air temperature sensing element such as a bi-metal thermal sensing device directly responsive to the temperature of the cooling air flowing over the fan drive clutch. The bi-metal element acts via a spring on a flange at the forward end of a piston stem which carries the differential piston and is attached to the valve plunger as in the previous example. This system thus provides an automatic control of the quantity of fluid in the clutch and hence the drive to the fan in accordance with the relationship between air temperature and fan speed.

The characteristic behavior of the viscous drive can be varied also by appropriate design of the return flow path from the reservoir 20 to the clearance gap. In the example of FIG. 1 there is a single return orifice 26, but it may be preferable to provide a series of apertures 75, 76, 77 etc., as illustrated in FIG. 6. With this arrangement it may be preferable that the outermost aperture 26 should be of reduced size. Hence when fluid is supplied to the reservoir by the scoop pump it will not drain back to the clearance volume at an excessive rate and the return rate will increase progressively as the volume of fluid in the reservoir increases, and the return flow is augmented by the additional apertures 75,76,77. It is also theoretically possible to achieve a similar result by use of a narrow elongated radial slot which may be of varying width, increasing towards the outer end, if required.

In the modification illustrated in FIG. 2, the apparatus has a bi-metal thermal sensing element 71 acting on the spool or plunger 74. In this case the main scoop pump $22^A$ delivers fluid into the reservoir 20' via the radial passage 24' and there is a second scoop type pressure pump 80 delivering fluid under pressure via passage 81 into the chamber 64" at the forward end of the piston 63". The stem 66' of this piston acts on a pivoted lever 82 whose outer end 83 is arranged to open and close the return aperture 26' from the reservoir. This is in contrast to the arrangement of FIG. 1 where the control valve elements 25,30 restricts the flow into the reservoir.

The embodiment illustrated in FIG. 3 incorporates certain elements of the examples of FIGS. 1 and 2. In this arrangement there is a pneumatic input 48' derived from a coolant temperature valve similar to the unit 44 in FIG. 1. This pneumatic pressure is delivered to the chamber 64' at the forward end of the piston 63'. The clutch has a main scoop pump 22" delivering fluid from the clearance gap into the reservoir 20" via passageway 24" and there is a second controlling scoop pump 80' supplying pressure fluid through passage 81' to the port on the axis formed by the projecting piston plunger 66'. This fluid pressure communicates via the central drilling with the chamber 65' at the rear side of piston 63'. The plunger in this example acts on a double rocking lever 82' whose outer end is arranged to open and close the fluid return aperture 26" allowing fluid to escape from the reservoir 20" and return to the clearance gap. In other respects this is similar to the example of FIG. 1 and operates in a comparable manner.

In the example illustrated in FIGS. 4 and 5 like parts are indicated by similar reference numerals and in this example the bi-metal element 71" is a spiral strip arranged to cause rotation of a control element 90 which acts through a torsion spring 91 on a rotary output lever 92. This lever bears on the valve stem 93 against the pressure of a spring 94 and controls the position of a valve arm 95 which opens and closes the return orifice 26'''. The clutch has a main scoop pump (not shown) similar to the pump 22' shown in the lower part of FIG. 2 and, in addition, an auxiliary scoop pressure pump 80" supplying pressure fluid along radial passage 81" to the chamber 96 at the adjacent end of the valve 97. Thus the scoop pressure which is a measure of clutch speed is opposed to the force exerted on the valve stem 93 by the bi-metal spiral sensing element 71".

In the example of FIGS. 7 and 8 the construction is in some respects similar to the examples of FIGS. 1 and 3 and like parts are indicated by the same reference numerals with different suffixes. In this case there is a pneumatic input line 48" derived from a coolant temperature valve similar to the unit 44 in FIG. 1. This pneumatic pressure is delivered to the left-hand end of a chamber 64" containing a piston 63". This acts via bearing 110 on a non-rotary cup 111 engaging the lower end 112 of a rocking lever 113 pivoted at 114. The upper end 116 of the lever acts as a valve element to open and close a pair of valve ports 118,119 and this same end of the lever is engaged by a piston 121 in a chamber which communicates with radial passage 81" connected to the "scoop" pressure port 23'. The pressure in radial passage 81" is transmitted via radial passage 125 in the piston 121 to the left-hand end of the chamber 126 and the pressure therefore urges this piston to the right against the rocking lever and opposing the pressure force acting on piston 63'. The net differential pressure force on the lever depends upon the relative cross-sectional areas of the two pistons and the relative lever arms of the two sides of the lever. In other respects this embodiment operates in the same manner as the example of FIG. 3.

In this construction of FIGS. 7 and 8 there are in fact three separate fluid pumping scoops 23' and 133,134 as illustrated in FIG. 8. The pressure from scoop 23' is applied to the piston 121, as described above, but this fluid does not return to the operating chamber of the viscous drive. The other two scoop pump elements 133,134 are arranged to deliver fluid continuously from the periphery of the working chamber to the central reservoir.

It will be noted that in all these examples of the invention the viscous fluid clutch has a casing surrounding an internal rotary member to define a clearance gap which may be occupied by the viscous fluid, and adjacent the periphery of the casing there is provided an impulse type fluid pumping means which generates fluid pressure dependent on the relative speed of rotation between the casing and the inner member. This speed-derived pressure force is in practice approximately proportional to the differential speed, by contrast with any other governing system involving centrifugal weights where the mechanical governing force is proportional to the square of the speed.

In these examples of the invention the thermal sensing device in each case senses the temperature of an external cooling liquid for the engine or of the cooling air passing over the clutch and through the associated cooling fan. This is by contrast with systems having a thermal control element located inside the viscous fluid clutch sensing the viscous fluid temperature.

In these illustrated examples of the invention the speed-derived pressure force is opposed directly to the thermal-derived pressure force to control the valve governing return flow of fluid to the clearance gap. This facilitates proper design of the parts and small tuning adjustments to ensure the proper balance between the two pressure forces over the whole operating range. For example in the FIG. 7 embodiment it is a comparatively simple adjustment to alter the pressure loading of the small spring 140 at the end of the plunger 63″. For example in the FIG. 7 embodiment it is a comparatively simple adjustment to replace the small spring 140 with a different spring having different pressure loading or other characteristics. This provides a very simple method of altering the balance or relationship between the pump scoop pressure and the thermal sensing pressure.

It will be appreciated that the flow control valve can be applied either to the supply flow of the viscous fluid from the pump to the reservoir or to the return flow from the reservoir to the clearance gap. In some examples, as in FIG. 1, the valve 50 controls the flow through the supply passage 24 and orifice 25 between the pump 22 and the reservoir 20. In such case it is normal to have a permanently open return port 26 (or a series of ports 75 to 77) and it will be appreciated that an increase in scoop pump pressure in the passage 24 will cause the valve spindle 61 to move to the left thus opening the port 25 and increasing the flow into the reservoir, which in turn results in a reduction in the quantity of liquid in the clearance gap. Likewise an increase in the thermal sensing pressure in the line 48 causes the valve spindle 61 to move to the right to throttle the flow through the orifice 25 and thus tend to increase the quantity of fluid in the clearance gap.

By contrast in systems, as illustrated in the examples of FIGS. 2, 5 and 7, the fluid pressure delivered by the scoop pump 22 acts on the valve assembly to regulate the return flow of fluid from the reservoir to the clearance gap via the port 26′, 26″ etc. In these cases an increase in scoop pump pressure is arranged to cause the port 26′ 119 etc. to be throttled thus reducing the quantity of viscous fluid in the clearance gap. It will be seen that the thermal sensing pressure force is applied in the opposite sense. It will be noted that in these several examples of the invention the scoop pump pressure derived from the relative speed between the clutch components is opposed to the thermal sensing pressure derived from the coolant or air flow and the result is to apply a differential force to the valve which will create large rapid changes in the valve opening and corresponding optimum clutch control. By contrast in any system incorporating a centrifugal speed governor the movements of the valve will be relatively slow and restricted and may cause undesirable speed fluctuations.

It will also be noted that in these examples the casing 11,12 has a slightly conical periphery as a result of which the viscous fluid drains towards the actual entry of the pump such that substantially all the viscous fluid can be extracted to reduce the drive effectively to zero and allow an extremely low idling speed of the fan.

I claim:

1. A viscous fluid shear clutch comprising a rotary casing connected to rotate with one drive element and an inner clutch member connected to rotate with another drive element and provided within said casing and spaced therefrom by a clearance gap for being filled with a fluid to provide a viscous coupling between said casing and said clutch member, a reservoir provided with said casing and communicating with said clearance gap, and pump means provided within said casing adjacent said clearance gap to receive fluid therefrom and deliver fluid under pressure to said reservoir in response to relative rotation between said casing and said inner member, thermal sensing means for sensing the temperature of a fluid external to said casing and for generating a pressure force dependent thereon, and valve means provided within said casing for controlling the flow of fluid between said pump means and said clearance gap, said valve means having a movable control element acted upon in one direction by a pressure force derived from said thermal sensing means and in the opposing direction by a pressure force derived from said pump means whereby an increase in pump pressure or a decrease in the sensed temperature, tends to adjust said valve means and thereby reduce the quantity of fluid in said clearance gap.

2. A viscous fluid shear clutch according to claim 1, constituting the drive to a cooling fan for an engine, and in which said thermal sensing means includes a thermal sensor arranged to sense the temperature of a coolant liquid or gas for the engine.

3. A viscous fluid shear clutch according to claim 1, including a source of servo fluid under pressure, a pressure regulating valve connected to said thermal sensing element to modify the output pressure of said valve in accordance with the sensed temperature, and means for applying said modified pressure to the control element of said valve means.

4. A viscous fluid shear clutch according to claim 1, including a differential piston assembly exposed in one direction to the pressure derived from said pump and in the other direction to the pressure derived from the sensed temperature.

5. A viscous fluid shear clutch according to claim 1, in which said thermal sensing means includes a bi-metal thermal sensing element positioned on the casing of the clutch and arranged to sense air temperature.

6. A viscous fluid shear clutch according to claim 1, including two fluid impellers or pumps, one for transferring fluid from the clearance gap to the reservoir, and the other for generating said fluid control pressure responsive to the relative speed of the components of the clutch.

7. A viscous fluid shear clutch according to claim 1, wherein said valve means controls a flow port in a supply passage between said pump and said reservoir, and in which said control element is arranged to increase the flow through said supply passage in response to an increased pump pressure, so as to reduce the quantity of fluid in said clearance gap.

8. A viscous fluid shear clutch according to claim 1, wherein said valve means controls a flow port in a return passage between said reservoir and said clearance gap, and in which said control element is arranged to reduce the flow through said return passage, in response to an increased pump pressure, so as to reduce the quantity of fluid in said clearance gap.

9. A viscous fluid clutch comprising a rotary casing connected to rotate with one drive element, and an inner clutch member within said casing spaced therefrom by a clearance gap and connected to rotate with another drive element, a reservoir communicating with said clearance gap, and a pump adjacent said clearance gap to receive fluid therefrom and deliver fluid under pressure to said reservoir in response to relative rotation between said casing and said inner member, thermal sensing means for generating a thermal pressure force dependent on a sensed temperature of a fluid or gas external to said casing, and valve means controlling the flow of fluid between said pump and said reservoir, said valve means having a movable control element acted upon in one direction by the pressure force derived from said pump and in the opposing direction by a pressure force derived from said thermal sensing means, and a return path for fluid from the reservoir to the clearance gap, the return path including at least one aperture in a wall of the reservoir providing for fluid flow at two or more different radial positions from the axis of rotation.

10. A viscous fluid clutch according to claim 9, in which the fluid flow from the reservoir is relatively low at increased radial positions from the axis.

11. A viscous fluid clutch according to claim 9, in which there are two or more separate return flow apertures at different radial positions.

12. A viscous fluid clutch according to claim 11, in which the outermost aperture is of relatively reduced cross-sectional area.

13. A viscous fluid clutch according to claim 9, in which the flow of fluid from the clearance gap to the reservoir is generated by a pump positioned near the periphery of the casing and arranged to cause fluid to flow radially inwards along an inlet passage to the reservoir as a result of relative rotation between the inner member and the casing.

14. A viscous fluid clutch according to claim 9, wherein said thermal sensing means includes a sensor arranged to sense said temperature of a coolant fluid or gas.

15. A viscous fluid clutch according to claim 9, wherein said valve means controls a flow port in a supply passage between said pump and said reservoir, and in which said control element is arranged to increase the flow through said supply passage in response to an increased pump pressure, so as to reduce the quantity of fluid in said clearance gap when said differential speed of rotation decreases.

16. A viscous fluid clutch according to claim 9, wherein said valve means controls a flow port in a return passage between said reservoir and said clearance gap, and in which said control element is arranged to reduce the flow through said return passage, in response to an increased pump pressure speed, so as to reduce the quantity of fluid in said clearance gap when the differential speed of rotation decreases.

* * * * *